US008498995B1

(12) United States Patent
Gond et al.

(10) Patent No.: US 8,498,995 B1
(45) Date of Patent: Jul. 30, 2013

(54) OPTIMIZING DATA RETRIEVAL DURING EVENT DATA QUERY PROCESSING

(75) Inventors: Sandeep Kumar Gond, Karnataka (IN); Biju Kaimal, Karnataka (IN)

(73) Assignee: EMC Corporation, Hopkinton, MA (US)

( * ) Notice: Subject to any disclaimer, the term of this patent is extended or adjusted under 35 U.S.C. 154(b) by 20 days.

(21) Appl. No.: 13/070,780

(22) Filed: Mar. 24, 2011

(51) Int. Cl.
*G06F 17/30* (2006.01)
*H04L 12/58* (2006.01)

(52) U.S. Cl.
CPC ................................. *H04L 12/58* (2013.01)
USPC ............ 707/754; 707/713; 707/741; 707/755

(58) Field of Classification Search
CPC ....................................................... H04L 12/58
USPC ................. 707/754, 705, 713, 741, 755, 757, 707/781, 802
See application file for complete search history.

(56) References Cited

U.S. PATENT DOCUMENTS

| 7,620,781 | B2 * | 11/2009 | Breternitz et al. | 711/154 |
|---|---|---|---|---|
| 7,653,670 | B2 * | 1/2010 | Hasan et al. | 707/999.205 |
| 7,769,967 | B2 | 8/2010 | Zhu et al. | |
| 7,895,325 | B2 * | 2/2011 | Van Vleet et al. | 709/224 |
| 7,937,428 | B2 * | 5/2011 | Beyer et al. | 708/300 |
| 8,018,940 | B2 * | 9/2011 | Hao et al. | 370/392 |
| 8,171,554 | B2 * | 5/2012 | Elovici et al. | 726/24 |
| 8,185,576 | B2 * | 5/2012 | Rose | 709/203 |
| 2005/0108368 | A1 * | 5/2005 | Mohan et al. | 709/220 |
| 2008/0071903 | A1 * | 3/2008 | Schuba et al. | 709/224 |
| 2010/0070514 | A1 * | 3/2010 | Woodruff | 707/754 |
| 2010/0125584 | A1 * | 5/2010 | Navas | 707/747 |
| 2012/0084459 | A1 * | 4/2012 | Wu et al. | 709/238 |

OTHER PUBLICATIONS

"RSA enVision® Platform at a Glance: 3 in 1 Log Management Solution," Product Data Sheet, RSA Security Inc., 2008-2009.

\* cited by examiner

*Primary Examiner* — Dangelino Gortayo
(74) *Attorney, Agent, or Firm* — BainwoodHuang (57) ABSTRACT

Embodiments of the invention relate to a method for retrieving event data. The method includes receiving, by an event management device, an event query requesting event data corresponding to a filtering parameter, the filtering parameter being a non-indexed database parameter of an Internet Protocol database (IPDB). The method includes generating, by the event manager device, a Bloom filter value based upon the filtering parameter included in the event query. The method includes comparing, by the event manager device, the Bloom filter value with a Bloom filter index entry of an index file of the IPDB, the index file corresponding to the requested event data, the Bloom filter index entry indicating existence of the filtering parameter as part of the IPDB and reading, by the event manager device, the entry from the index file database when the Bloom filter value matches the Bloom filter index entry.

22 Claims, 4 Drawing Sheets

OPTIMIZING DATA RETRIEVAL DURING EVENT DATA QUERY PROCESSING

BACKGROUND

Certain regulatory institutions have provided best practice recommendations and data regulations for enterprises utilizing Information Security Management Systems (ISMS). In order to comply with the many existing global data regulations, including regulations relating to the Payment Card Industry (PCI) Data Security Standard (DSS) and the Health Insurance Portability and Accountability Act (HIPAA), among others, corresponding enterprises utilize a variety of security platforms to provide data security controls as part of a compliance framework.

For example, certain security platforms, such as the RSA enVision® platform produced by EMC Corporation, Hopkinton, Mass., are configured to collect event or log data, such as security related events or authentication events, generated by event sources, such as servers, routers, and switches present on an enterprise's network. As the security platform collects the event log data, the security platform stores the event data as part of an Internet Protocol Database (IPDB). Based upon the event data stored in the IPDB, an administrator can query the security platform and retrieve data reports regarding network, file, application, and user activity tailored to a variety of compliance requirements. Additionally, based upon the log data stored in the IPDB, the security platform can provide the administrator with security event alerts that allow the administrator to see security threats and risks in real time and to take effective actions to mitigate those threats and risks.

SUMMARY

As indicated above, certain security platforms utilize file based storage for storing event data, collected from event sources, as part of an IPDB. As the IPDB stores the event data as part of a database, the IPDB typically indexes the event data based on four device parameters associated with the event data. These parameters include device type, device address, message identifier (ID), and collection timestamp.

In the case where an administrator wants to retrieve event data associated with a network, the administrator transmits a query for event data to the security platform during a querying procedure. While the query typically includes one or more of the above-listed four parameters, the query can include additional variables as well. For example, the administrator can transmit a query requesting all event data from a particular device (e.g., device type=Switch A) generated by a particular user (username="Joe Smith"). Once the security platform receives the event data query from the administrator, a data manager component of the conventional security platform fetches the event data from the IPDB based only upon one of the four aforementioned parameters included in the query. In the case where the query includes variables outside of the aforementioned four parameters, the data manger component ignores these additional variables. With respect to the present example, the event data query includes a request for event data associated with both a particular device type and a particular user name. Because the user name variable is not one of the four parameters used to index event data as part of the IPDB, the data manager component ignores the user name variable and retrieves, from the IPDB, all event data related with the particular device type requested, in this case Switch A.

With such a configuration, the conventional data manager component gathers more event data from the IPDB in response to an event data query than is necessary. Because of this, during the retrieval process, the data manager component performs multiple disk input/output (I/O) procedures to read the event data from the IPDB, CPU processing to normalize the event data, and transmission of the event data to an upper layer, where actual filtering of the event data occurs. Such processing of the relatively large event data set is time consuming. Furthermore, in the case where an enterprise includes multiple security platforms distributed about multiple sites, in response to an event data query, relatively large amounts of non-optimized event data can be exchanged among multiple nodes in the network which leads to slower query processing.

By contrast to conventional data relocation scheduling, embodiments of the present invention relate to data retrieval during event data query processing. An event management device extends the existing IPDB indexing by using a space efficient data structure filter, such as a Bloom filter index, to check for existence of specific variable instances, such as conventionally non-indexed database parameters, within the IPDB data prior to reading and processing the event data. The Bloom filter index is configured to provide an indication that a particular non-indexed database parameter exists within a group of data. In use, as the event management device receives event queries for a selected non-indexed database parameter, the event management device utilizes the associated Bloom filer index to filter event data in the IPDB to provide a first level of event data culling. Such culling can lead to faster query processing by the event management device by minimizing unnecessary reading of event data from the IPDB. This, in turn can save device processor time during event data query processing. Furthermore, in a network having a distributed event management system with multiple event management devices distributed across the network, with application of Bloom filter indexing, the size of the query result files exchanged among the event management devices across the network, such as a wide area network (WAN) can be reduced, thereby reducing latency for event data query processing as well as reducing the amount of event data to be processed.

In one arrangement, embodiments of the invention relate to a method for retrieving event data. The method includes receiving, by an event management device, an event query requesting event data corresponding to a filtering parameter, the filtering parameter being a non-indexed database parameter of an Internet Protocol database (IPDB). The method includes generating, by the event manager device, a set of Bloom filter bit positions corresponding to the filtering parameter included in the event query. The method includes detecting, by the event manager device, a value of each bit position of a Bloom filter index entry corresponding to the generated set of Bloom filter bit positions, the Bloom filter index entry corresponding to an index file associated with the IPDB, the index file corresponding to the requested event data, the Bloom filter index entry indicating existence of the filtering parameter as part of the IPDB. The method includes, when each bit position of a Bloom filter index entry corresponding to the generated set of Bloom filter bit positions has a value equal to one, reading, by the event manager device, event data corresponding to the Bloom filter index entry from the IPDB.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

Embodiments of the present invention relate to data retrieval during event data query processing. An event management device extends the existing IPDB indexing by using a space efficient data structure filter, such as a Bloom filter index, to check for existence of specific variable instances, such as conventionally non-indexed database parameters, within the IPDB data prior to reading and processing the event data. The Bloom filter index is configured to provide an indication that a particular non-indexed database parameter exists within a group of data. In use, as the event management device receives event queries for a selected non-indexed database parameter, the event management device utilizes the associated Bloom filer index to filter event data in the IPDB to provide a first level of event data culling. Such culling can lead to faster query processing by the event management device by minimizing unnecessary reading of event data from the IPDB. This, in turn can save device processor time during event data query processing. Furthermore, in a network having a distributed event management system with multiple event management devices distributed across the network, with application of Bloom filter indexing, the size of the query result files exchanged among the event management devices across the network, such as a wide area network (WAN) can be reduced, thereby reducing latency for event data query processing.

Figure 1:
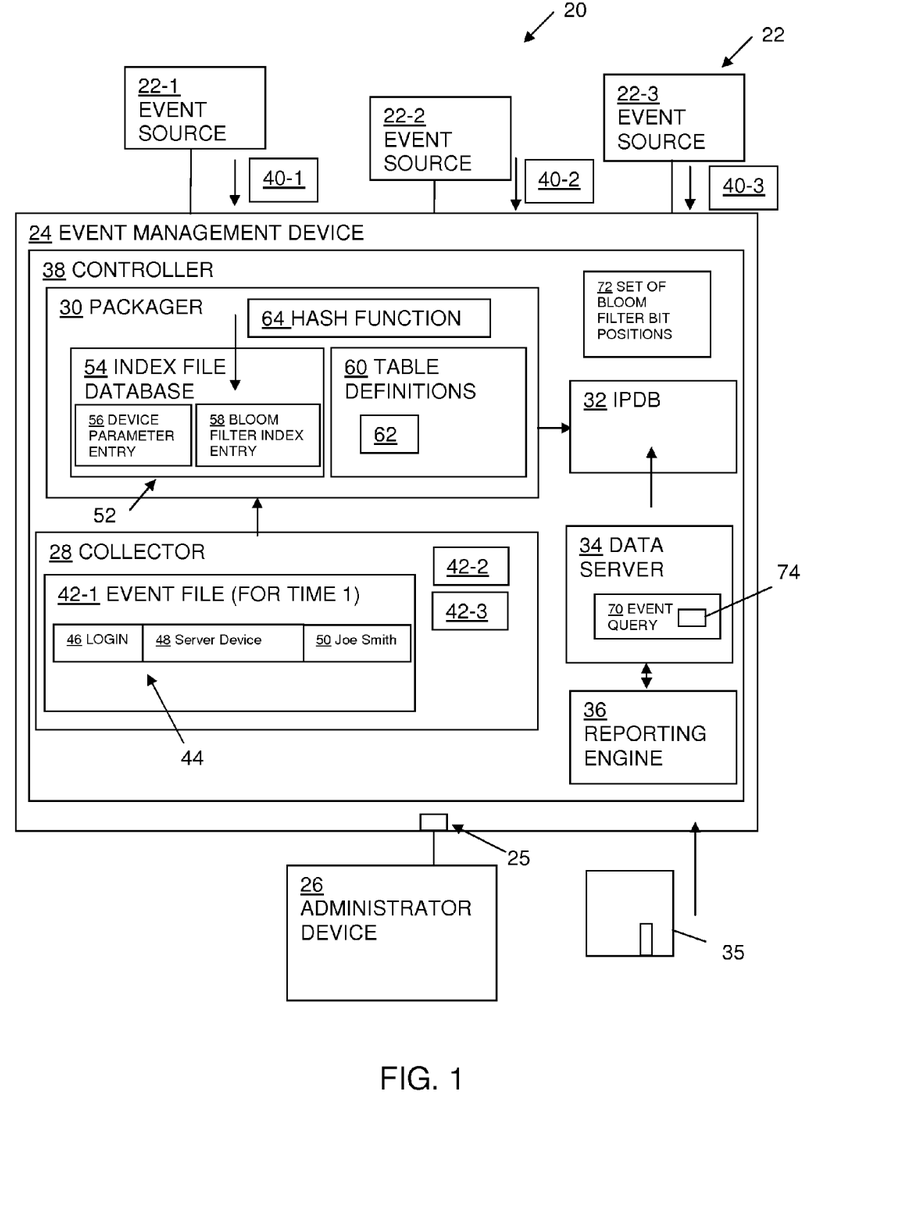
FIG. 1 illustrates a schematic representation of an enterprise network having a security platform, according to one embodiment.

FIG. 1 illustrates an example arrangement of a network 20, such as used by an enterprise. As shown, the network 20 includes a set of event sources, collectively 22, an event management device 24, and an administrator device 26.

The event sources 22, such as servers, routers, and switches, are configured to generate event data or log messages in response to security related events or authentication events. For example, assume event source 22-1 is configured as a server device. When a client device, such as a user computer, attempts to login to the server device 22-1, the server device 22-1 generates event data related to the attempted login process. For example, the server device 22-1 collects information associate with the login attempt, such as the name of the user associated with the client device, the client device network address, and a timestamp associated with the login and includes the information as part of the event data. While three event sources 22-1, 22-2, 22-3 are illustrated, it should be understood that the network 20 can include any number of event sources 22.

The administrator device 26, such as a computerized device, is configured to monitor the network 20 for log events, such as collected by the event management device 24. In one arrangement, the administrator device 26 is configured to transmit event queries to the event management device 24 to retrieve log events associated with the event sources 22 on the network 22. For example, an administrator device user sends the event queries to the event management device 24 using a Web browser associated with the administrator device 26.

The event management device 24 is disposed in electrical communication with the event sources 22 and is configured to collect event data generated by each event source, index the event data, and store the event data as part of an Internet Protocol Database (IPDB). In one arrangement, the event management device 24, such as RSA enVision® platform produced by EMC Corporation, Hopkinton, Mass., includes a collector 28 configured to collect event data from the event sources 22, a packager 30 configured to index various parameters of the event data, and an IPDB 32 configured to store the indexed parameters of the event data. In one arrangement, the collector 28, packager 30, and IPDB 32 form part of a controller 38, such as a memory and a processor, of the event management device 24. However, while controller 38 is illustrated illustrates as part of the event management device 24, it should be understood that the collector 28, packager 30, and IPDB 32 can be distributed across the network 22 as part of several devices that define an event management device 24.

The event management device 24, such as a computerized device, is disposed in electrical communication with the administrator device 26 through a communications interface 25 by way of a cable or by way of a network connection, such as a remote network connection. The event management device 24 includes the controller 38 disposed in electrical communication with the communications interface 25. In one arrangement, the controller 38 stores an event data retrieval application. The event data retrieval application installs on the event management device 24 from a computer program product 35. In some arrangements, the computer program product 35 is available as downloadable online media. For example, the event data retrieval application can be downloaded from a web server on the network 20. When performed on the controller 38 of the event management device 24, the event data retrieval application causes the event management device 24, in response to receiving an event query from the administrator device 26, to retrieve event data from the IPDB 32 base upon a Bloom filter index identifying a conventionally non-indexed database parameter of the IPDB.

In use, the event management device 24 is configured to collect and index the event data received from the event sources 22 prior to storing the event data 40 as part of the IPDB 32. Event data 40 can include variables that are indexed as part of the IPDB by conventional event management devices. As indicated above, these variables include parameters associated with the event data, which include device type, device address, message identifier (ID), and collection timestamp. Event data 40 can also include parameters, such as client device user name, client device Internet Protocol (IP) address, port number, and host name, which are not indexed as part of the IPDB by conventional event management devices. Such parameters are termed non-indexed database parameters or filtering parameters.

As part of the indexing, in one arrangement, the event management device 24 is configured to generate an index file 54 for the event data 40. The index file or index file database 54 includes a set of index entries 52 based on the four conventionally indexed, device parameters associated with the event data, (i.e., device type, device address, message identifier (ID), and collection timestamp), as well as based upon conventionally non-indexed database filtering parameters, such as client device user name, client device Internet Protocol (IP) address, port number, and host name. As will be described below, with respect to the non-indexed database filtering parameters, the event management device 24 is configured to create a Bloom filter index for the filtering parameters to provide an indication that a particular non-indexed database parameter exists within a group of event data stored by the IPDB.

During operation, the event management device 24 first collects event data 40 from each event source 22 over a particular time period, such as over a period of about one minute. For example, each event source 22-1, 22-2, 22-3 can generate event data 40-1, 40-2, 40-3, respectively over the time period in response to security related events or authentication events. Once the event management device 24 has received the event data 40-1, 40-2, 40-3, at the end of the time period the collector 28 writes the event data 40-1, 40-2, 40-3 from each event source 22-1, 22-2, 22-3, respectively, into a corresponding nugget file or event file 42-1, 42-2, 42-3 for that time period. For example, once the collector 28 has received the event data 40-1 from the first event source 22-1 for a given time period, such as over the course of one minute, the collector 28 writes the event data 40-1 corresponding to the first event source to the event file 42-1. The collector 28, in turn, writes the event data 40 from the other event sources 22-2, 22-3 to respective event files 42-2, 42-3 for the given time period. As the event management device 24 continues to receive event data 40 from the event sources 22 for subsequent time periods, the collector 28 writes the event data 40 to separate event files 42, corresponding to the particular event sources 22, for each subsequent time period. The collector stores each of the event files 42 as part of the IPDB 32.

As illustrated in FIG. 1 and taking event file 42-1 as an example, the event file 42-1 includes a set of event data strings 44 corresponding to the event data or log messages 40-1 received from the first event source 22-1. Each of the event data strings 44 includes information relating to the event data 40-1 associated with the event source 22-1. For example, a first event data string 44-1 includes a message ID parameter 46 indicating that the event data 40-1 relates to a login attempt, a device type parameter 48 indicating the event source 22-1 of the event data 40-1 as a server device, and a username parameter 50 indicating the name of the user attempting to login to the event source 22-1 as "Joe Smith." Based upon the parameters present in the event data strings 44 of an event file 42, the event management device 24 is configured to generate a set of index entries 52 for a corresponding index file database 54. It should be noted that as the event management device 24 generates an event file 42 for each minute per each event source 22, the event manager 24 is configured to create an index file database 54 corresponding to each event file 42 (i.e., for each minute per each event source). The creation of a single index file database 54 corresponding to a single event file 42-1 which contains event data 40 from the first event source 22-1 collected over the course of one minute is described below as an example.

In one arrangement, during operation, the packager 30 retrieves an event file 42 from the collector 28 and reads through or accesses each of the event data strings 44 contained by the event file 42. In the case where an event data string 44 includes indexed device parameters (i.e., device type, device address, message identifier (ID), or collection timestamp parameters) the packager 30 generates device parameter entries 56 based upon these parameters and stores the index entries as part of the index file data base 54. For example, as the packager 30 reads the event data string 44-1, the packager 30 identifies the login entry as a message ID parameter 46 indicating that the event data 40-1 relates to a login attempt and identifies the server device entry as a device type parameter 48 identifying the event source 22-1 of the event data 40-1 as a server device. In such a case, the packager 30 generates indexed device parameter entries 56 corresponding to the login entry 46 and server device entry 48 device parameters for the index file database 54.

In the case where an event data string 44 includes a conventionally non-indexed database parameter entry or filtering parameter, such as a user name, an IP address, a port number, or a host name, the packager 30 can create a Bloom filter index entry 58 based upon the filtering parameter and store the Bloom filter index entry 58 as part of the index file database 54. The Bloom filter index entry 58 is a data structure configured to provide an indication that a particular non-indexed database parameter exists within a group of data, such as stored by the IPDB.

For example, in use, as the packager 30 reads the event data string 44-1, the packager 30 identifies the string "Joe Smith" as being a filtering parameter entry of the event data string 44-1, specifically a username parameter entry 50 that indicates the name of the user attempting to login to the event source 22-1 and that is conventionally not indexed as part of the IPDB. Prior to creating a Bloom filter index entry 58 for the string "Joe Smith" of the username parameter entry 50, the packager 30 first accesses a table definitions file 60 which lists event data string variables 62 defining a set of filtering parameters that can be converted into Bloom filter index entries by the packager 30. For example, assume the table definitions file 60 includes as event data string variables 62 user name, IP address, and port number. With such inclusion in the table definitions file 60, the variables user name, IP address, and port number are defined as being available for conversion into Bloom filter index entries. Accordingly, when the packager 30 compares the username parameter entry 50 of the event data string 44-1 with the event data string variables 62, because "user name" is included as part of the event data string variables 62, the packager 30 identifies a match between the username parameter 50 and an event data string variable 62 of the table definitions file 60. With such identification of the match, the packager 30 can continue the process of generating the Bloom filter index entry corresponding to username parameter 50 of the event data string 44-1.

For example, in the case where the packager 30 detects a correspondence between a filtering parameter of the event data string 44-1, in this case the username parameter entry 50, and an event data string variable 62 of the table definitions file 60, the packager 30, the packager 30 extracts the content of the username parameter entry 50 and applies a hash function 64 to the content of the username parameter entry 50 to generate the Bloom filter index entry 58. An empty Bloom filter index is defined as a bit array of a given number of bits where each bit has a value of zero. As a result of the packager 30 applying a hash function to the string "Joe Smith" extracted from the username parameter entry 50, the packager 30 generates a set of indices in the bit array of the empty Bloom filter index such that certain bits at particular positions in the bit array are set to a value of one. The resulting bit array is a Bloom filter index entry 58 corresponding to the username parameter "Joe Smith." The packager 30 then writes the Bloom filter index entry 58 to the index file database 54.

Figure 2:
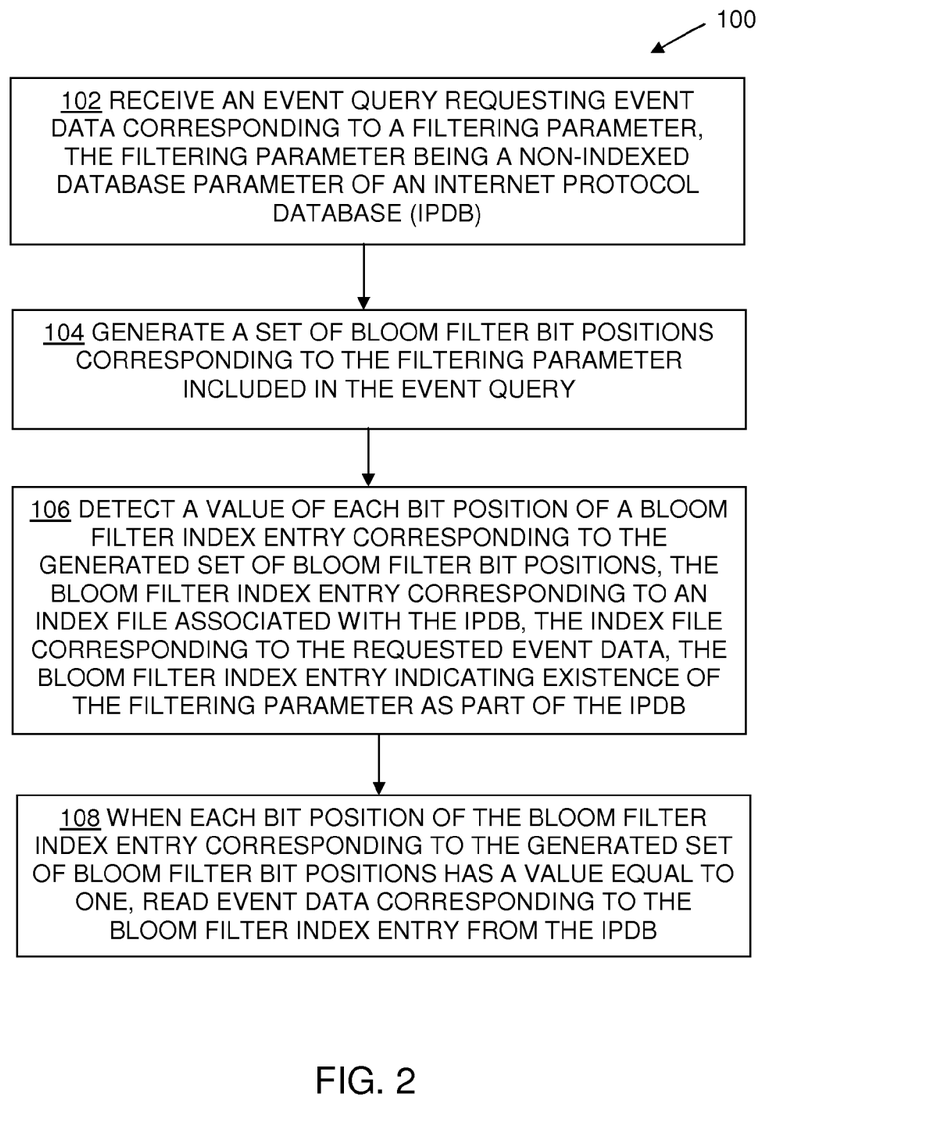
FIG. 2 is a flowchart that illustrates an event query processing procedure performed by an event management device of FIG. 1.

With both the device parameters and certain filtering parameters associated with the event data 40 being indexed as part of the index file database 54, the event manager device 24 is configured to retrieve event data 40 in response to event queries 70 generated by the administrator device 26. FIG. 2 is a flowchart 100 that illustrates a procedure performed by the event management device 24 when retrieving event data 40 in response to receiving an event query 70 from the administrator device 26.

In step 102, the event management device 24 receives an event query 70 requesting event data 40 corresponding to a filtering parameter, the filtering parameter being a non-indexed database parameter of an IPDB 32. For example, with reference to FIG. 1, assume the administrator device 26 transmits a Structured Query Language (SQL) event query 70 to the event management device 24 requesting all login events generated by user Joe Smith on the first event source 22-1 of the network 20. In response to receiving the event query 70, a data server 34 reviews the event query 70 to detect the presence of filtering parameters or non-indexed database parameters. For example, because the event query 70 includes a request for login events for a particular event source 22-1, the data server 34 can recognize these elements as belonging to two of the four conventionally indexed device parameters, message identifier (ID) and device type, respectively. However, because the string "Joe Smith" is a user name included in the event query 70, the user name does not fall into one of the four conventionally indexed device parameters (i.e., device type, device address, message identifier (ID), and collection timestamp). Accordingly, the data server 34 can recognize this element as potentially being a non-indexed database filtering parameter 74.

To detect if the user name is, in actuality, a non-indexed database filtering parameter, prior to reading event data from the IPDB 32, the data server 34 reviews the table definitions file 60 to detect the presence of an event data string variable 62 that corresponds to the potential filtering parameter, as received as part of the event query 70. For example, as indicated above, the table definitions file 60 lists event data string variables 62 defining a set of filtering parameters that can be converted into Bloom filter index entries by the packager 30. Also as described above, the variables user name, IP address, and port number are defined as part of the event data string variables 62. Accordingly, when the data server 34 compares the user name 74 of the event query 70 with the event data string variables 62, because "user name" is included as part of the event data string variables 62, the data server 34 identifies a match between the user name 74 of the event query 70 and an event data string variable 62 of the table definitions file 60.

Returning to FIG. 2, in step 104, the event management device 24 generates a set of Bloom filter bit positions 72 corresponding to the filtering parameter included in the event query 70. In one arrangement, with reference to FIG. 1, in response to detecting the presence of the event data string variable 62 corresponding to the non-indexed database filtering parameter 74 of the event query 70, the data server 34 is configured to generate the set of Bloom filter bit positions 72 based upon the non-indexed database filtering parameter string contained as part of the event query 70. For example, the data server 34 extracts the filtering parameter 74, in this case the string "Joe Smith" from the event query 70 and applies a hash function to the filtering parameter 74 to generate the set of Bloom filter bit positions 72. The resulting set of Bloom filter bit positions 72 correspond to the non-indexed database filtering parameter 74 "Joe Smith."

In step 106, the event management device 24 detects a value of each bit position of a Bloom filter index entry 58 corresponding to the generated set of Bloom filter bit positions 72, the Bloom filter index entry 58 corresponding to an index file 54 associated with the IPDB 32, the index file 54 corresponding to the requested event data 40, the Bloom filter index entry 58 indicating existence of the filtering parameter 74 as part of the IPDB 32. For example, assume the case where the Bloom filter index entry 58 includes an array of eight bit positions numbered one through eight. Further assume that the generated set of Bloom filter bit positions 72 instructs the event management device 24 to check the values of the second, fourth, and sixth bit positions of the Bloom filter index entry 58 for the index file 54 associated with the IPDB 32. In such a configuration, the event management device 24 detects the values of the second, fourth, and sixth bit positions of the Bloom filter index entry 58.

In step 108, when each bit position of the Bloom filter index entry 58 corresponding to the generated set of Bloom filter bit positions 72 has a value equal to one, the event management device 24 reads event data 40 corresponding to the Bloom filter index entry 58 from the IPDB 32. For example, as the event management device 24 detects that the values of the second, fourth, and sixth bit positions of the Bloom filter index entry 58, assume the event management device 24 determines that all of the second, fourth, and sixth bit positions are set to a value of one. Such a result indicates that the string "Joe Smith" requested in the event query 70 is present within an event data string 44 of a given event file 42 (i.e., an event file 42-1 associated with the first event source 22-1). Accordingly, in this case, the data server 34 reads the event data string 44 corresponding to the Bloom filter index entry 58 for further processing. For example, as indicated above, the event query 70 included a request for conventionally indexed device parameters (i.e., login events). Accordingly, prior to providing the event data string 44 to a reporting engine 36, the data server 34 provides additional, conventional filtering based upon the conventionally indexed device parameters. Once the reporting engine 36 has received a set of event data string entries corresponding to the event query and following the filtering, the report engine 36 generates an event report and forwards the report to the administrator device 26 in response to the event query 70.

With respect to the above example, assume the case where the event management device 24 detects at least one of the values of the second, fourth, and sixth bit positions of the Bloom filter index entry 58 as being set to zero. Such detection indicates that the string "Joe Smith" requested in the event query 70 is not present within an event data string 44 of a given event file 42 (i.e., an event file 42-1 associated with the first event source 22-1). Accordingly, the data server 34 refrains from reading the event data string 44 corresponding to the Bloom filter index entry 58 for further processing. Rather, the event management device 24 proceeds to subsequent Bloom filter index entries 58 in the index file 54 to detect the value of each bit position of the subsequent Bloom filter index entries 58 corresponding to the generated set of Bloom filter bit positions 72 and to read event data 40 corresponding to the subsequent Bloom filter index entries 58 from the IPDB 32 when each bit position of the subsequent Bloom filter index entries 58 corresponding to the generated set of Bloom filter bit positions 72 has a value equal to one.

The use of the Bloom filter index 58 allows the event management device 24 to check for existence of specific variable instances, such as conventionally non-indexed database parameters, associated with a set of IPDB data prior to reading and processing the event data. Accordingly, by using the Bloom filter index 58 to provide the first level of data culling of event data strings 44 stored as part of the IPDB 32, the event manager device 24 provides relatively fast event query processing by minimizing an associated disk I/O to read unnecessary data from the IPDB 32. This, in turn, saves controller processor time typically used event data normalizing. Furthermore, application of the Bloom filter index 58 helps the data server 34 to read a smaller subset of event files 42 from the IPDB 32 which, in turn, leads to more optimized controller (i.e., memory and processor) resource consumption.

While various embodiments of the invention have been particularly shown and described, it will be understood by those skilled in the art that various changes in form and details may be made therein without departing from the spirit and scope of the invention as defined by the appended claims.

Figure 3:
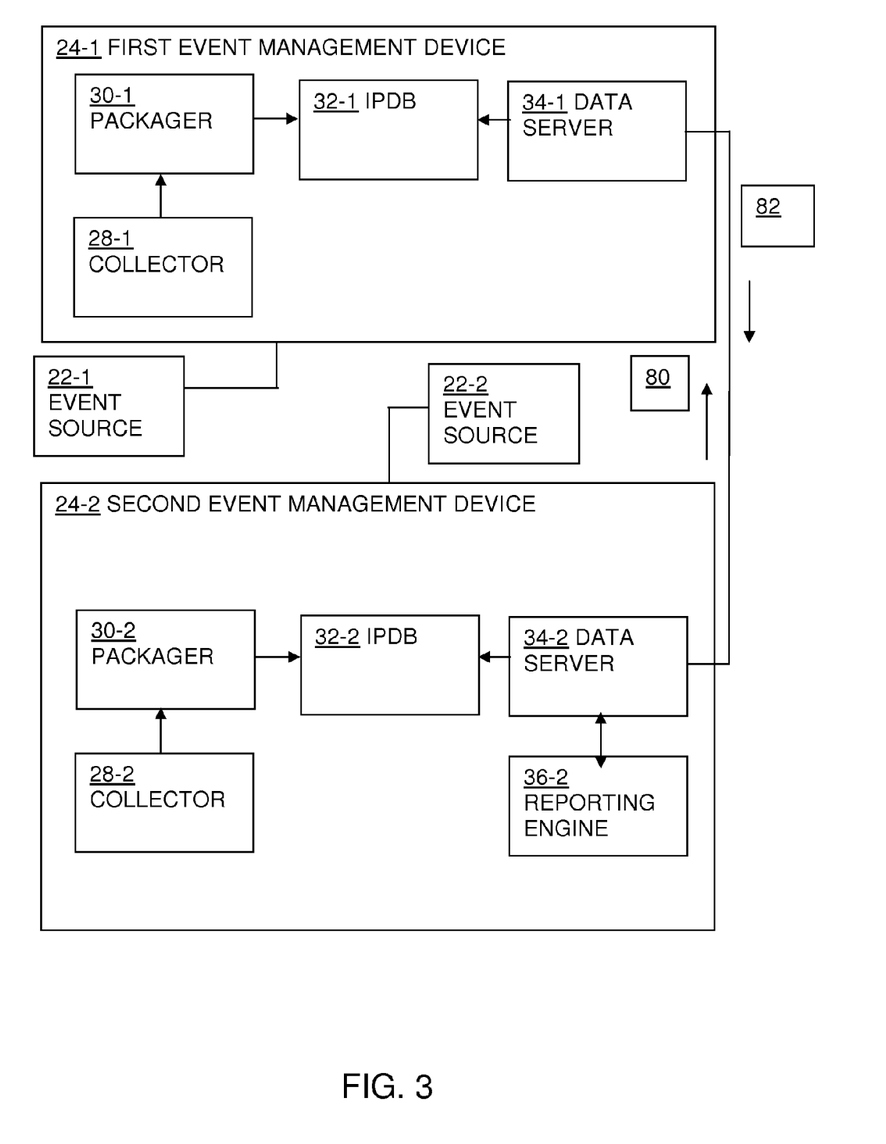
FIG. 3 illustrates a schematic representation of an enterprise network having multiple security platforms, according to one embodiment.

FIG. 1 illustrates the network as having a single event management device 24. Such illustration is by way of example only. As illustrated in FIG. 3, the network 20 can include a distributed event management system having first and second event management devices 24-1, 24-2 disposed in different locations within the network 20. In such an arrangement, assume an administrator device 26 transmits an event query 70 to a particular event management device, such as the second event management device 24-2, where the event query 70 requests certain event data 40 stored by all of the event management devices on the network 20. In such a case, because the second event management device 24-2 received the event query 70, the second event management device 24-2 transmits event queries 80 to the other event management devices on the network, in this case the first event management device 24-1.

In the case where the event query 70 includes a request for event data corresponding to the filtering parameter, the first event manager device 24-1 performs the Bloom filter index process described above to reduce the size of the event data 40 corresponding to the event query 70. Once the first event manager device 24-1 has the read event data 40 corresponding to the Bloom filter index entry from the IPDB 32, the first event management device 24-1 then forwards the entry to the second event manager device 24-2 for provision to the administration device 26. Accordingly, with application of Bloom filter index, the first event management device 24-1 can reduce the size of the event data set prior to transmitting the event data set across the network 20. Accordingly, the first event management device 24-1 is configured to improve bandwidth and minimize network latency when processing event queries in a distributed event management system.

As indicated above with respect to FIG. 1, the event management device 24 is configured to collect event data 40 from each event source 22 over a particular time period, such as over a period of about one minute and write the event data collected for a particular event source into an event file 42. For example, the collector 28 of the event management device 24 collects event data 40-1 from the first event source 22-1 every minute and, for each minute writes the event data 40-1 into corresponding event files 42. Also as describe above, as the event management device 24 generates an event file 42 for each minute per each event source 22, the event manager 24 is configured to create an index file or index file database 54 corresponding to each event file 42 (i.e., for each minute per each event source).

Figure 4:
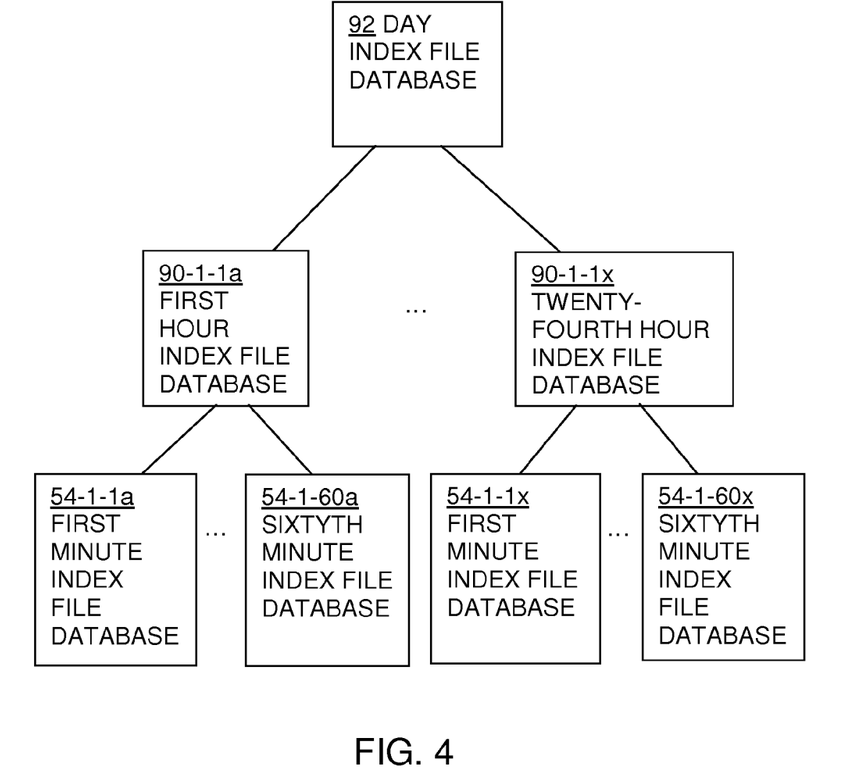
FIG. 4 illustrates an index file database roll-up hierarchy, according to one embodiment.

In one arrangement, as illustrated in FIG. 4, with respect to the first event source 22-1, the event management device 24 creates a set of index file databases 54-1-1a through 54-1-60x corresponding to the event files 42 created over a period of twenty four hours. However, in one arrangement, to improve event query processing speed, the event management device 24 is configured to reduce the number of index file databases 54 stored by generating roll-up index file databases. For example, the event management device 24 can create a set of hour based index file databases 90 termed first roll-up files 90. As illustrated, and with respect to the first hour index file database 90-1-1a, the event management device 24 gathers all sixty minute index file databases 54-1-1a through 54-1-60x, performs a union of the Bloom filter index entries 58 across all of the minute index file databases 54-1-1a through 54-1-60x, and stores the result as the first hour index file database 90-1-1a. The event management device 24 can repeat this process for each hour within a twenty-four hour period. Also as illustrated, the event management device 24, the event management device 24 can create a set of day based index file databases 92 termed second roll-up files 92. For example, the event management device 24 gathers all twenty-four hour based index file databases 90-1-1a through 90-1-1x, performs a union of the Bloom filter index entries 58 across all of the hour index file databases 90-1-1a through 90-1-1x, and stores the result as the first day index file database 92.

What is claimed is:

1. A method for retrieving event data, comprising:
    receiving, by an event manager device, an event query requesting event data corresponding to a filtering parameter, the filtering parameter being a non-indexed database parameter of an Internet Protocol database (IPDB);
    generating, by a packager device portion of a controller device in the event manager device, a set of Bloom filter bit positions corresponding to the filtering parameter included in the event query, and storing the set of Bloom filter bit positions in a Bloom filter database separate from the IPDB;
    detecting, by the packager device in the event manager device, a value of each bit position of a Bloom filter index entry corresponding to the generated set of Bloom filter bit positions from the Bloom filter database and storing the Bloom filter index entry in an index file database in the packager device separate from the IPDB located in the controller device of the event manager device, the Bloom filter index entry in the index file database corresponding to an index file associated with the IPDB located in the controller device, the index file corresponding to the requested event data, the Bloom filter index entry indicating existence of the filtering parameter as part of the IPDB; and
    when each bit position of the Bloom filter index entry corresponding to the generated set of Bloom filter bit positions has a value equal to one, reading, by the event manager device, event data corresponding to the Bloom filter index entry from the IPDB;
    wherein the index file database further includes index entries for parameters in groups of event data in the IPDB.

2. The method of claim 1, wherein generating the set of Bloom filter bit positions corresponding to the filtering parameter included in the event query further includes:
    detecting, by the event manager device, the presence of an event data string variable within a table definitions file stored in a separate database in the packager device, the event data string variable corresponding to the filtering parameter; and
    in response to detecting the presence of the event data string variable corresponding to the filtering parameter:
        extracting, by the event manager device, the filtering parameter from the event query, and
        applying, by the event manager device, a hash function stored in the packager device to the filtering parameter extracted from the event query to generate the set of Bloom filter bit positions corresponding to the filtering parameter.

3. The method of claim 1, comprising, prior to receiving the event query requesting event data corresponding to the filtering parameter, generating, by the event manager device, the index file having a set of index entries.

4. The method of claim 3, wherein generating the index file having the set of index entries, comprises:
- receiving, by the event manager device, event data from an event source over a time period;
- writing, by the event manager device, the event data from each event source into a corresponding event file for that time period; and
- generating, by the event manager device, the set of index entries for the index file database based upon the event file, the set of index entries configured to include an indexed device parameter entry and a Bloom filter index entry.

5. The method of claim 4, wherein generating the set of index entries for the index file database based upon the event file comprises:
- accessing, by the event manager device, an event data string of the event file;
- comparing, by the event manager device, a filtering parameter entry of an entry of the event data string with an event data string variable of a table definitions file;
- when the filtering parameter entry of the event data string matches an event data string variable of a table definitions file, generating, by the event manager device, the Bloom filter index entry corresponding to the event data string of the event file.

6. The method of claim 5, wherein generating the Bloom filter index entry corresponding to the event data string of the event file comprises:
- extracting, by the event manager device and from the event data string of the event file, the content of filtering parameter entry of the event data string;
- applying, by the event manager device, a hash function to the content of the filtering parameter entry of the event data string to generate the Bloom filter index entry corresponding to the entry of the event data string; and
- writing, by the event manager device, the Bloom filter index entry to the index file.

7. The method of claim 6, wherein when each bit position of the Bloom filter index entry corresponding to the generated set of Bloom filter bit positions has a value equal to zero, and wherein the method further comprises:
- retrieving Bloom filter index entries stored in the index file to detect the value of each bit position of the stored Bloom filter index entries corresponding to the generated set of Bloom filter bit position; and
- reading event data corresponding to the stored Bloom filter index entries from the IPDB when each bit position of the stored Bloom filter index entries corresponding to the generated set of Bloom filter bit positions has a value equal to one.

8. The method of claim 4, wherein writing the event data from each event source into a corresponding event file for that time period further comprises, generating, by the event manager device, the index file corresponding to the event file for event data received from each event source over a time period of one minute.

9. The method of claim 8, comprising generating, by the event manager device, a first roll-up file containing a union of the index files corresponding to a set of event files collected over a time period of one hour.

10. The method of claim 9, comprising generating, by the event manager device, a second roll-up file containing a union of the first roll-up files collected over a time period of one day.

11. The method of claim 1, wherein:
- receiving the event query requesting event data corresponding to the filtering parameter, the filtering parameter being a non-indexed database parameter of the IPDB comprises receiving, by a first event manager device, the event query from a second event manager device requesting event data corresponding to the filtering parameter, the filtering parameter being a non-indexed database parameter of the IPDB, the first event manager device and the second event manager device defining a distributed system; and
- following reading, by the event manager device, event data corresponding to the Bloom filter index entry from the IPDB when each bit position of a Bloom filter index entry corresponding to the generated set of Bloom filter bit positions has a value equal to one, forwarding, by the first event manager device, the entry to the second event manager device.

12. The method of claim 1, wherein the event manager device comprises a portion of a security platform and the event query includes real time security event data;
- wherein the filtering parameter includes a database parameter of an Internet Protocol database (IPDB) associated with a compliance framework from at least one of PCI, DSS, HIPPA and ISMS protocols; and
- wherein reading the event data corresponding to the Bloom filter index entry from the IPDB includes providing an event search database containing fewer event data entries than the IPDB prior to reading and processing the event data.

13. An event manager device for retrieving event data, comprising:
- a communications interface; and
- a controller disposed in electrical communication with the communications interface, the controller configured to:
- receive an event query requesting event data corresponding to a filtering parameter, the filtering parameter being a non-indexed database parameter of an Internet Protocol database (IPDB), wherein the IPDB is located in the controller;
- a packager device in the controller to generate a set of Bloom filter bit positions corresponding to the filtering parameter included in the event query and a Bloom filter database in the packager device to store the set of Bloom filter bit positions, wherein the Bloom filter database is separate from the IPDB;
- detect a value of each bit position of a Bloom filter index entry corresponding to the generated set of Bloom filter bit positions from the Bloom filter database, wherein the Bloom filter index entry is stored in an index file database in the packager device separate from the IPDB, the Bloom filter index entry corresponding to an index file associated with the IPDB, the index file corresponding to the requested event data, the Bloom filter index entry indicating existence of the filtering parameter as part of the IPDB; and
- when each bit position of the Bloom filter index entry corresponding to the generated set of Bloom filter bit positions has a value equal to one, read event data corresponding to the Bloom filter index entry from the IPDB;
- wherein the index file database further includes index entries for parameters in groups of event data in the IPDB.

14. The event manager device of claim 13, wherein when generating the set of Bloom filter bit positions corresponding to the filtering parameter included in the event query, the controller is configured to:
- detect the presence of an event data string variable within a table definitions file stored in a separate database in the packager device, the event data string variable corresponding to the filtering parameter; and in response to detecting the presence of the event data string variable corresponding to the filtering parameter: extract the filtering parameter from the event query, and apply a hash function stored in the packager device to the filtering parameter extracted from the event query to generate the set of Bloom filter bit positions corresponding to the filtering parameter.

15. The event manager device of claim 13, wherein, prior to receiving the event query requesting event data corresponding to the filtering parameter, the controller is configured to generate the index file having a set of index entries.

16. The event manager device of claim 15, wherein when generating the index file having the set of index entries, the controller is configured to:

receive event data from an event source over a time period;

write the event data from each event source into a corresponding event file for that time period; and generate the set of index entries for the index file database based upon the event file, the set of index entries configured to include an indexed device parameter entry and a Bloom filter index entry.

17. The event manager device of claim 16, wherein when generating the set of index entries for the index file database based upon the event file, the controller is configured to:

access an event data string of the event file;

compare a filtering parameter entry of the event data string with an event data string variable of a table definitions file;

when the filtering parameter entry of the event data string matches an event data string variable of a table definitions file, generate the Bloom filter index entry corresponding to the filtering parameter entry of the event data string of the event file.

18. The event manager device of claim 17, wherein when generating the Bloom filter index entry corresponding to the filtering parameter of the event data string of the event file, the controller is configured to:

extract from the event data string of the event file the content of the filtering parameter entry of the event data string;

apply a hash function to the content of the filtering parameter entry of the event data string to generate the Bloom filter index entry corresponding to the filtering parameter entry of the event data string; and write the Bloom filter index entry to the index file.

19. The event manager device of claim 16, wherein when writing the event data from each event source into a corresponding event file for that time period, the controller is configured to generate the index file corresponding to the event file for event data received from each event source over a time period of one minute.

20. The event manager device of claim 19, wherein the controller is configured to generate a first roll-up file containing a union of the index files corresponding to a set of event files collected over a time period of one hour.

21. The event manager device of claim 20, wherein the controller is configured to generate a second roll-up file containing a union of the first roll-up files collected over a time period of one day.

22. A computer program product having a non-transitory computer-readable medium including computer program logic encoded thereon that, when performed on a controller of an event manager device causes the event manager device to:

receive an event query requesting event data corresponding to a filtering parameter, the filtering parameter being a non-indexed database parameter of an Internet Protocol database (IPDB);

generate a set of Bloom filter bit positions in a packager portion of the controller, the Bloom filter bit positions corresponding to the filtering parameter included in the event query, and store the set of Bloom filter bit positions in a Bloom filter database in the packager separate from the IPDB;

detect a value of each bit position of a Bloom filter index entry corresponding to the generated set of Bloom filter bit positions from the Bloom filter database, wherein the Bloom filter index entry is stored in an index file database in the packager separate from the IPDB, the Bloom filter index entry corresponding to an index file associated with the IPDB, the index file corresponding to the requested event data, the Bloom filter index entry indicating existence of the filtering parameter as part of the IPDB; and when each bit position of the Bloom filter index entry corresponding to the generated set of Bloom filter bit positions has a value equal to one, read event data corresponding to the Bloom filter index entry from the IPDB;

wherein the index file database further includes index entries for parameters in groups of event data in the IPDB.

* * * * *